March 5, 1963 — W. L. MORRISON — 3,079,762
METHOD OF COOLING FROZEN FOOD TO SUB-ZERO TEMPERATURES
Filed Jan. 2, 1959 — 2 Sheets-Sheet 1

INVENTOR
WILLARD L. MORRISON
BY PARKER & CARTER
ATTORNEYS

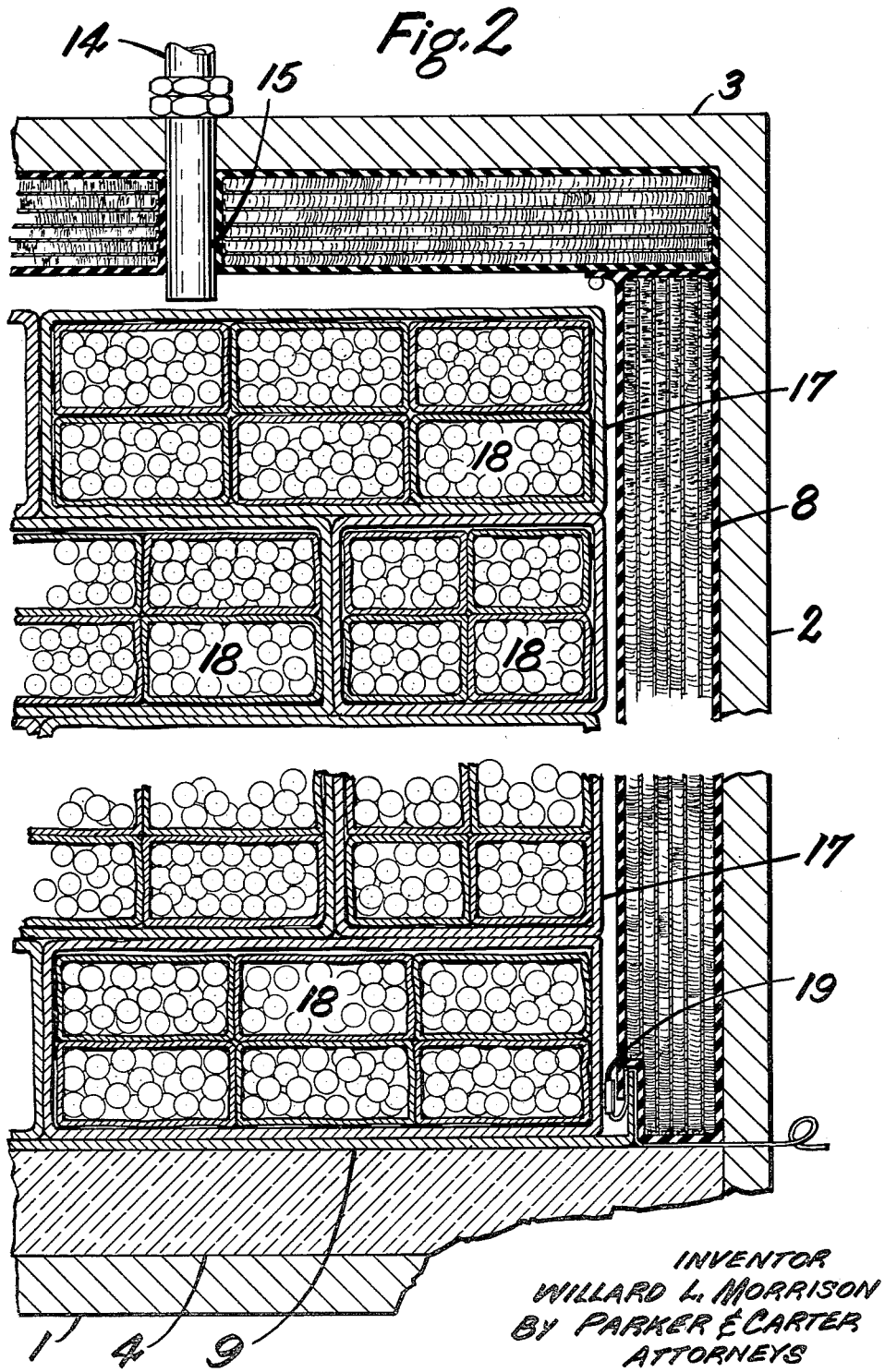

3,079,762
METHOD OF COOLING FROZEN FOOD TO SUB-ZERO TEMPERATURES
Willard L. Morrison, Lake Forest, Ill., assignor to Liquefreeze Company, Inc., New York, N.Y., a corporation of New York
Filed Jan. 2, 1959, Ser. No. 784,738
2 Claims. (Cl. 62—64)

This invention relates to method of cooling frozen food to sub-zero temperatures and has for one object to provide a method whereby food previously frozen to temperatures in the order of zero degrees F., or below, may be greatly reduced in temperature for storage of shipment or both.

In carrying out this invention, frozen food packages of the type common in the food industry are assembled or packed enmasse in an insulated storage or shipper container and are then cooled in the container to temperatures far below zero degrees F., after which they may be stored or shipped or both without removal without further treatment and without being touched by human hands or machinery. This is important because the very low temperatures involved make it highly undesirable for the packages to be exposed to ambient air or to be manually contacted by human hands.

The cooling accomplished in the shipper container is brought about by exposing all the surfaces of all packages to uninterrupted, continuously renewed films of liquid nitrogen or the like at atmospheric pressure and at approximately —320 degrees F. The liquid nitrogen films are so associated with the food packages that all the packages—not just some of them—are cooled to a point such that upon end of storage or arrival at destination, the temperature will still be below a predetermined satisfactory and safe temperature.

This is accomplished by wetting all the surfaces of the packages with a liquid nitrogen film so that the heat of the packages boils the liquid and the loss of heat to the liquid nitrogen results in reducing the temperature of the packages to the desired low point.

The method proposed—and it has been commercially successful—makes it possible to cool the food to the desired low temperature with a minimum of delay and without the necessity of providing a liquid tight container which would be necessary if the foodstuffs were to be immersed in a liquid bath.

Cold gas alone is too slow and is limited in the amount of heat pick up unless usual wind tunnel practices are used where the individual packages are separately exposed, by being spaced apart, to gas or air forced around them. This is not possible when the packages are closely assembled as they must be when tightly packed for shipment. Under these circumstances, wind tunnel methods will not work.

It has been suggested to cool by spraying the cold boiling liquid against the article to be cooled and while this may be satisfactory as applied to individual separate packages, it is quite unsatisfactory and ineffective when applied to an assembly of packages closely packed for shipment. When spray is used in this manner, evaporation takes place so rapidly that most, if not all of the coling is by the gas and the spray will not wet all sides of all the food packages for rapid and accurate cooling.

When liquid nitrogen or the like is sprayed into the chamber against the food, the first thing that happens is that the spray particles pick up heat and cool the atmosphere other than the food. When the liquid itself is brought as liquid, not as spray, not as gas, in contact with the food package, then and then only is the benefit of latent heat available for rapid cooling because then and then only can be liquid in the film encompassing the food package boil as a liquid.

It is important that the liquid be spread over all sides of every package in a substantially continuous concatenate series of films so that the films contact the surfaces of the packages throughout their entire area for effective boiling of the liquid.

The food packages will be closely packed in the insulated shipper container as packages, one on top of the other in immediate juxtaposition. In order to insure penetration of the liquid into the clearances between the packages so that the package surfaces will all become wet with the liquid film, a wick-like liquid absorptive liquid saturable wall will be placed between the surfaces. Cardboard or soft, porous boxboard or the like may be used and it is convenient to do this by packing a number of separate packages in such a boxboard box or carton of the usual type. When an assembly of these cartons are placed in the container, the liquid nitrogen as liquid is poured in a stream or streams onto the top of the pile or assembly so that the liquid sheet spreads out all over the top of the assembly, soaking the cardboard walls. The liquid passes through and along these walls and wets the surfaces of the packages immediately adjacent. The liquid also passes down between adjacent cartons saturating the vertically disposed cardboard walls and then further penetrates horizontally beneath the cartons wetting all the walls.

As the liquid continues to be supplied to the packages more rapidly than it is evaporated, it spreads along the walls as it saturates them until all the walls are completely saturated and a liquid saturated concatenated wet wall structure is defined extending throughout the entire mass.

As this liquid saturated, concatenated structure is formed, the excess liquid travels in from the concatenated wall structure into the clearances between the separate packages contained within the cartons, this travel being perhaps as a result of capillary attraction or hydrostatic pressure or both because the liquid wets the surfaces so that as a result liquid is boiled off from all the surfaces of the package until the temperature reaches the desired low point.

It is important that the rate of flow of the liquid discharged as a stream upon the surfaces be such that as it spreads, it will travel down along the outer boundaries of the mass as well as the inner interstices and the rate of flow can be controlled to insure that the mass will absorb all the liquid without lateral dispersion away from the mass or an excessive accumulation of liquid at the bottom of the mass.

Thermocouples may be placed in the bottom of the mass and the rate of flow be controlled so that as the temperature of the thermocouples at the bottom indicates that the liquid has penetrated to the bottom of the mass, the rate of flow may be reduced. If desired, however, a shallow pan may be provided beneath the mass so that any excess liquid will be caught there and may be drained off and reused as liquid by recirculation.

The invention is illustrated more or less diagrammatically in the accompanying drawings, wherein—

FIGURE 2 is a vertical section through a part of the mass of material contained within the truck body;

Like parts are indicated by like characters throughout the specification and drawings.

Figure 1:
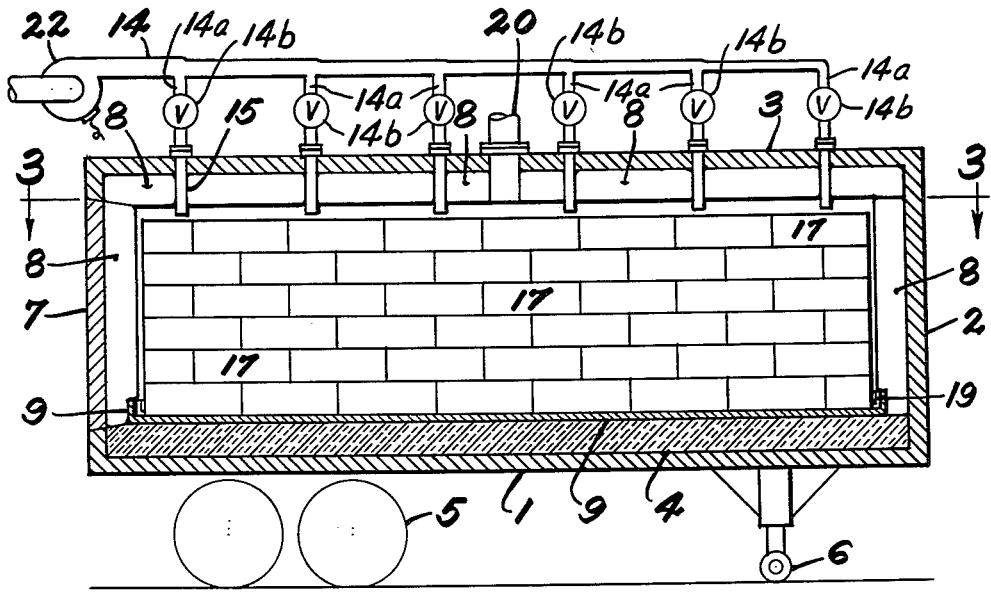
FIGURE 1 is a longitudinal section of a truck body which serves as a shipper container embodying my invention.
Figure 3:
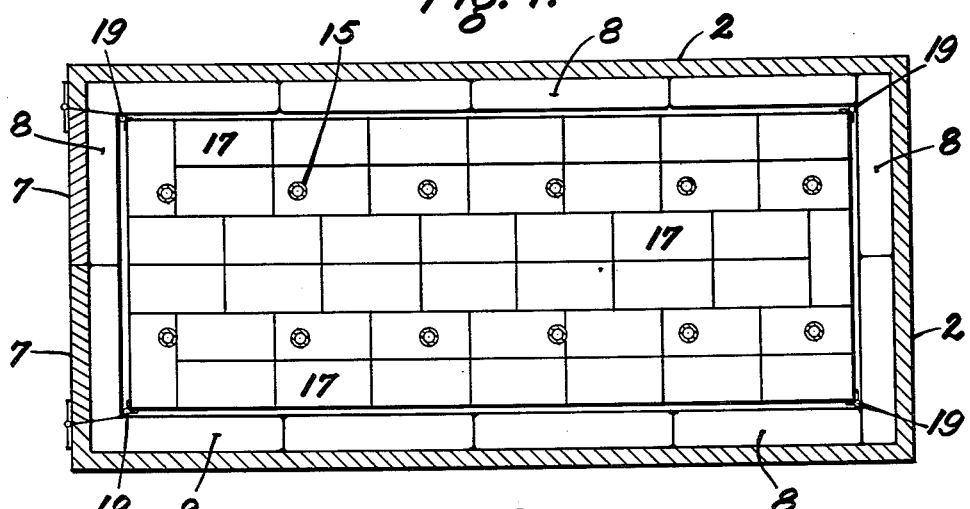
FIGURE 3 is a section along the line 3—3 of FIGURE 1.
Figure 4:
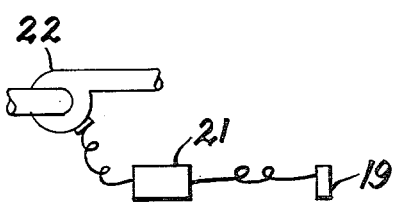
FIGURE 4 is a diagrammatic view of the control mechanism.

The trailer body having bottom, side and top walls, 1, 2 and 3 may be for example permanently insulated at the bottom as at 4, is supported on road wheels 5 and may for loading and cooling be supported on castor wheels 6. The trailer has an end door 7. Removably mounted within the trailer on walls, roof and end door are a plurality of bags 8 which contain insulating material, for example, parallel cotton fibers. These bags may be separately mounted in place, may be inflated when insulation is desired, and may be deflated or removed when insulation is not needed or when increased volumetric capacity is desired. These removable bags define a continuous insulating wall for the container such as indicated in my co-pending application Serial No. 778,851, filed December 8, 1958, now Patent No. 2,951,608.

Supported on the insulating floor 4 is a shallow pan 9 in which the base of the mass of material rests. The purpose of the pan is to catch any excess of the liquid coolant which might unfortunately develop.

The duct 14 receives liquid nitrogen from any suitable source of supply pumped into the duct by the pump 22. Branches of the duct 14a are removably connected to injector pipes 15 in the top of the shipper container. Valves 14b may be manipulated to selectively control the distribution of the liquid over the cargo. When liquid nitrogen is no longer to be supplied, these branches will be disconnected and the pipes 15 closed by any suitable plugs. These pipes 15 and there may be one or many of them as the case may be, discharge the liquid nitrogen in uninterrupted solid streams of liquid at atmospheric pressure into the container against the cargo contained therein at selected overlapping locations.

The cargo comprises a multiplicity of cartons 17 of cardboard, boxboard or similar porous material. Each carton may contain a number of different packages 18 of frozen food. The cartons are packed as indicated in FIGURE 2 so that the porous walls of the carton define a path both horizontally and vertically for movement of the liquid as the liquid saturates the cartons. Thus there is around each group of packages a concatenated layer of the liquid in and about the carton wall.

One or more thermocouples 19 adjacent the bottom of the cargo are connected as indicated to a control mechanism 21 which in turn controls the pump 22 so that when the thermocouple is wet with the liquid nitrogen at —320 degrees F., the pump will shut off and remain shut off until the liquid nitrogen has evaporated and the thermocouple is exposed to slightly higher temperature at which feed will be resumed.

As the liquid travels downwardly, part of it being boiled and evaporated off, part of its gradually downwardly increasing the area of saturation, maximum discharge of the liquid is desired because the faster the liquid penetrates to the bottom of the load, the sooner will the desired temperature be reached. Once the liquid has reached the bottom of the load, from then on only the amount of liquid necessary to replace that being evaporated needs to be supplied. Therefore, it is desirable to limit the flow after the whole mass is wet to a rate just sufficient to compensate for evaporation.

The important thing is that the surfaces from which heat must be extracted must be wet with a substantially continuous film of liquid. Starting with the saturated carton walls, the film spreads over all the package surfaces penetrating between the packages as a result of capillary attraction, surface tension, adhesion or absorption as the case may be. The essential thing is that the film continuously wets all the package walls so that evaporation and heat extraction takes place in the concatenated films interposed between and enclosing all the packages.

However it happens, the essential thing is that the surface be wet with this concatenated, continuous liquid film which is brought to the boiling point and from which the gas evaporates, the film being continuously renewed or replaced. Such replacement cannot occur when liquid globules are sprayed on the surface. The liquid must contact as a solid liquid stream, and progress along the surfaces as a substantially continuous film.

As the liquid nitrogen boils, it expands some six hundred times and the gas must escape. It will escape through any suitable vent such as the vents 20 in the top of the vessel. One or more vents may be used, as desired.

While liquid nitrogen might be supplied from a suitable source and the resultant gas be wasted, it is preferred to recover that gas and reliquefy it for reuse in the same general manner as illustrated in co-pending application Serial No. 586,205 filed May 21, 1956, now Patent No. 2,959,034, the details of such reliquefaction forming no part of the present invention and not illustrated.

The use and operation of the invention are as follows:

Food is first packed in the conventional frozen food packages well known on the market. Each individual package is then in the usual manner frozen to the desired temperature generally in the order of zero degrees F. or somewhat below. Each individual package is then packed in a carton having a porous, liquid absorptive and liquid penetrative wall. It might be corrugated paper, boxboard or any of the well known packaging materials except that they will not be liquid-proof and so liquid can easily penetrate the cartons.

The cartons will then be packed in contact with one another in the usual way to fill an insulated shipper container, apertured at the top. The packages and the cartons are generally rectangular but in commerce have immeasureable inaccuracies of size and shape so that there is always some measure of clearance between the packages in the carton, between the packages and the carton walls and between the cartons themselves.

Liquid nitrogen is then poured in a continuous stream as a liquid rather than as a spray or gas into the container, being discharged against the upper surfaces of the upper cartons. This liquid wets the carton walls, spreads out along the surfaces of the walls, travels vertically along the vertical carton walls, wetting and saturating top, bottom and side carton walls, wetting the surfaces of the packages. The liquid spreads in a continuous series of concatenate films defining a network of continuous film of the liquid gradually encompassing as it descends downwardly from the point of entrance along the surfaces of all of the packages. The liquid spreads by surface tension or capillary attraction or adhesion or absorption, the exact reason why the spreading takes place being unimportant, the essential thing being that the liquid does so spread and does finally as supply continues at a rate greater than the rate of evaporation finally form concatenate, articulate network of films of liquid so that the outer surface of every package is wet with the liquid and gives up heat to evaporate the liquid. The gas returns along the lines or planes of entrance of the liquid for discharge at the top of the container.

When the liquid has finally reached the bottom of the mass, there will be a sudden drop in temperature. Such drop is reflected in the thermocouple adjacent the bottom of the mass and at this time the rate of flow which previously was more rapid than the rate of evaporation, will be reduced in consonance with the rate of evaporation. Thus after the entire mass has been wet, the rate of evaporation and the rate of flow will be balanced to maintain continuous contact and wetting of all the exposed package surfaces with resultant continuous extraction of heat from the contents of the packages. This will continue until the thermocouple indicates that the desired low temperature has been reached, or until a sufficient length of time depending upon the specific heat of the material has lapsed to insure reaching the desired low temperature.

The packages in which foodstuffs are habitually frozen are not necessarily liquid tight. With respect to packages which are not liquid tight, there will be some measure of penetration of the liquid into the package itself. Such penetration is not harmful, is on the contrary, desirable because it will increase the rate at which heat is extracted from the material. The gas boiled off as it is discharged from the container will be reliquefied for recirculation. Every effort is made to get rid of the gas as rapidly as possible. The pressure in the container is maintained at atmospheric. The gas is rapidly withdrawn so that the heat exchange is with the liquid, not with the gas. The liquid is poured into the container in a solid stream in sharp contrast as inflow as a gas or as a spray. The liquid being sprayed in would evaporate more rapidly even before it came in contact with the foodstuff and as a result less effective heat exchange would occur. It is important that the heat exchange be as rapid as possible. This method is especially applicable to the shipping of foodstuffs in trucks, freight cars or conveyors and the frozen food will be packed in the trailer before it is lowered in temperature. That means that a large quantity of the material, together with an expensive container will be tied up during cooling. Hence the importance of insuring rapid cooling which can best be obtained when the heat exchange is with the liquid as a continuous stream or film in contrast with gas or liquid in spray form.

The method here disclosed makes it possible to closely freeze a closely packed mass of separate food packages in a liquid pervious container wherein little of any of the coolant liquid is wasted by contact with and cooling of the insulation. The insulation being left in the main dry, all the heat required to boil the liquid will come from the foodstuffs themselves and the insulation will preferably be cooled by the gas boiled off from the liquid.

It may be difficult to avoid some moistening of the insulation and some evaporation of liquid thereon but this is incidental and relatively unimportant and to be avoided.

The best effect is obtained when the liquid evaporates from the concatenated films surrounding the packages extending through the mass. There may be some accumulation of liquid at the bottom of the pile owing to the difficulty of controlling the supply. It is desirable to so control the supply of liquid in consonance with flow of liquid through the mass and the rate of evaporation to minimize, if not inhibit formation of a pool of liquid at the bottom of the pile. When the liquid reaches as liquid the thermocouple, then the thermocouple cuts off the flow until the liquid is evaporated. After which further flow will take place. Under these circumstances, the supply of liquid will be in consonance with the rate of evaporation so as to maintain and renew the concatenated films. Since the films are defined between the closely packed packages and since the liquid is fed at the top of the pile, liquid travels downwardly under the influence of gravity and by capillary attraction. The gas boiled off as this migration continues, passes upwardly or laterally and upwardly to escape from the top of the container. Thus when liquid supply stops, the container is closed for storage or shipment and will contain besides the foodstuffs only the residual gas boiled off from the liquid.

It is highly desirable that the container be gas tight so that gas boiled off will not be wasted to ambient atmosphere but may be withdrawn for reliquefaction. The pressure in the box of course is substantially atmospheric pressure and can be controlled at the relative rates at which liquid is supplied and gas is withdrawn.

Since it is desirable that the liquid permeate the entire mass along the concatenate film paths, another reason for avoiding wetting of the insulation is that if the insulation is wet, the liquid will be guided downwardly to the bottom of the pile by the wall and this is undesirable. It is a waste of energy to cool the insulation wall to temperatures below the food. The food is the lowest temperature. The gas evolved may cool the wall and the wall may still be slightly above the food temperature.

I claim:

1. The method of preparing perishable material such as foodstuffs for storage and shipment which consists in packing the material in a plurality of separate, liquid pervious, wrapped packages, introducing the packages into a portable shipping container, separating each of the packages in the container with a wall formed of a porous and highly absorbent material whereby, when liquid nitrogen is introduced into the container, the liquid nitrogen is carried by the separating absorbent walls to the surfaces of each of the packages for substantially uniform distribution of the liquid nitrogen throughout the shipping container, and then pouring liquid nitrogen into the container whereby the absorbent separating walls carry the liquid nitrogen for substantially uniform distribution throughout the container to enclose each of the packages.

2. The method of claim 1 in which the liquid nitrogen carried by the absorbent separating walls throughout the shipping container and about each of the packages is introduced in an amount to saturate the separating walls with liquid and to form a substantially continuous concatenate film network within the clearances about the packages.

References Cited in the file of this patent

UNITED STATES PATENTS

| | | |
|---|---|---|
| 2,137,902 | Walter | Nov. 22, 1938 |
| 2,381,796 | Williams | Aug. 7, 1945 |
| 2,618,939 | Morrison | Nov. 25, 1952 |
| 2,890,123 | Brown et al. | June 9, 1959 |
| 2,894,373 | Morrison | July 14, 1959 |
| 2,948,123 | Morrison | Aug. 9, 1960 |